United States Patent Office 3,258,500
Patented June 28, 1966

3,258,500
PROCESS FOR FLUORINATING HALOHYDRO-
CARBONS
Frederic W. Swamer, Boothwyn, and Benjamin W. Howk, West Chester, Pa., assignors to E. I. du Pont de Nemours and Company, Wilmington, Del., a corporation of Delaware
No Drawing. Filed Aug. 17, 1959, Ser. No. 833,962
17 Claims. (Cl. 260—653.7)

This invention relates to a process for catalytic vapor phase fluorination of halohydrocarbons and more particularly to the substitution of fluorine for other halogens in halohydrocarbons which contain halogens other than or in addition to fluorine, employing an improved catalyst for such reaction.

The process of this invention is applicable to the preparation of a large number of fluorinated compounds which in general are well known and are valuable for a wide variety of purposes such as refrigerants, propellents, dielectrics, general inert solvents, selective solvents in extraction operations, and compounds characterized by stability to high temperatures and chemical attack. Many of the lower boiling products such as dichlorodifluoromethane, chlorotrifluoromethane and trichlorofluoromethane are well known and have been widely used as refrigerants and as propellents. More highly fluorinated or completely fluorinated compounds of the aliphatic series, such as carbon tetrafluoride, chloropentafluoroethane, hexafluoroethane, chloroheptafluoropropane, octafluoropropane, perfluorobutane, and perfluorocyclobutane are known and are recognized as being useful as refrigerants and propellents but they have not been readily available, particularly at low cost, because they have been difficult to make and have been obtainable only by complex and expensive procedures. One procedure for producing carbon tetrafluoride, for example, comprises two steps: the conversion of dichlorodifluoromethane to chlorotrifluoromethane over alumina and then the fluorination of chlorotrifluoromethane over chromium fluoride to produce carbon tetrafluoride.

The catalysts commonly used for replacing chlorine and bromine by fluorine in making fluoromethanes and fluoroethanes, have included antimony pentahalides, chromium oxyfluorides, chromium fluoride, aluminum fluorides, activated carbon, and aluminum oxide impregnated with metal halides. While commercial processes have been developed for employing such catalysts, such processes have been quite limited in efficiency, in economy of operation, and in the extent to which the fluorination of the halohydrocarbon could be induced to proceed. Usually complete fluorination is obtained with considerable difficulty and to only a limited extent, resulting in low yields of the desired product and high costs.

It is an object of this invention to provide a process for fluorinating halohydrocarbons of the aliphatic series which contain 1 or more halogen atoms other than or in addition to fluorine so as to partially or completely replace such other halogen atoms by fluorine. Another object is to provide a catalytic vapor phase process for reacting anhydrous hydrogen fluoride with halogenated aliphatic hydrocarbons so as to replace halogen atoms therein other than fluorine in the presence of an improved and highly active and efficient catalyst. A further object is to provide such a process which is practical, efficient, economical and simple and easy to operate and control, so as to obtain high yields of the desired products. Still other objects will appear hereinafter.

The above and other objects may be accomplished by the process of this invention which comprises contacting a vapor mixture of a halogenated aliphatic hydrocarbon of 1 to 8 carbon atoms in which adjacent carbons are linked solely by 1 to 2 valence bonds and in which the halogen atoms have an atomic weight of less than 80 and include at least one halogen atom having an atomic weight between 35 and 80 and at least a stoichiometric proportion of anhydrous hydrogen fluoride with a catalyst which consists essentially of an activated anhydrous chromium (III) oxide at a temperature in the range of from about 150° C. to about 700° C. such that the principal reaction is the substitution of fluorine for other halogen of the halogenated hydrocarbon, and separating the fluorinated compound from the reaction mixture.

It has been found that the catalysts of the character above specified are exceptionally active and efficient in such process to cause the hydrogen fluoride to react with the halogenated hydrocarbons of the specified class so that fluorine is substituted for chlorine and bromine to produce the desired fluorinated or more highly fluorinated products in unusually high yields and without requiring excessively high temperatures. The process is readily controlled to produce any desired degree of fluorine substitution and is particularly effective for the complete replacement of other halogens by fluorine, especially for the preparation of fluorocarbons from other completely halogenated hydrocarbons.

The process is simple and easily carried out by passing a gaseous mixture of anhydrous hydrogen fluoride and the halogenated hydrocarbon over or through the catalyst maintained at the desired temperature in a conventional reactor of the type commonly employed for reactions of this character. Usually, the gaseous mixture will be passed through a bed of the catalyst in a reaction tube. The reaction tube may be constructed of any metal or other material that is inert to anhydrous hydrogen fluoride, hydrogen chloride and hydrogen bromide at temperatures up to 700° C. and is resistant to heat for extended periods of time. Suitable materials for construction of the reaction tube include Hastelloy C nickel alloy, Inconel nickel alloy, nickel, stainless steel, platinum, and fused refractory alumina such as Alundum.

The halogenated aliphatic hydrocarbons which may be fluorinated by the process of this invention are those which contain 1 to 8 carbon atoms and in which adjacent carbon atoms are linked solely by 1 to 2 valence bonds. These include the saturated compounds, such as halogenated alkanes and halogenated cycloalkanes, and unsaturated compounds, such as the halogenated alkenes and halogenate cycloalkenes. Preferably, the halogenated hydrocarbons are the acyclic compounds, such as the halogenated alkanes and halogenated alkenes, and particularly the saturated acyclic halogenated hydrocarbons. The halogen atoms in the halogenated hydrocarbons are those which have an atomic weight of less than 80, i.e., fluorine, chlorine and bromine, and include at least one halogen atom having an atomic weight between 35 and 80, i.e., chlorine and bromine. The halogenated hydrocarbons may be partially or completely halogenated, that is, from one to all of the hydrogen atoms will be replaced by halogen atoms, including at least one of chlorine and bromine. The compounds that may be fluorinated by the process of this invention include the following which for convenience are presented in groups having members that are related in composition or in structure.

*Group I.*—Chloro- and bromoalkanes of the general formula $C_mH_nX_y$ where $m=1$-$8$, $n+y=2m+2$, and $X=Cl$ or $Br$.

Representatives:

| | | |
|---|---|---|
| $CH_3Cl$ | $CH_3Br$ | |
| $CH_3CH_2Cl$ | $CH_3CH_2Br$ | |
| $CH_3CH_2CH_2CH_2Cl$ | $CH_3CH_2CH_2CH_2Br$ | |
| $CH_2Cl_2$ | $CH_2Br_2$ | $CH_2ClBr$ |
| $CH_3CHCl_2$ | $CH_3CHBr_2$ | $CH_3CHClBr$ |
| $ClCH_2CH_2Cl$ | $BrCH_2CH_2Br$ | $BrCH_2CH_2Cl$ |
| $CHCl_3$ | $CHBr_3$ | $CHClBr_2$ |
| $CH_3CCl_3$ | $CH_3CBr_3$ | $CHCl_2Br$ |
| $ClCH_2CHCl_2$ | | |
| $CCl_4$ | | |
| $CCl_3CCl_3$ | | |

*Group II.*—Chloro-, bromo-, fluoroalkanes of the general formula $C_mH_nBr_xCl_yF_z$ where $m=1$-$8$, $$n+x+y+z=2m+2$$

$x+y$ is at least one, and $z$ is at least one.
Representatives:

| | | |
|---|---|---|
| $CF_3Cl$ | $CF_2Cl_2$ | $CFCl_3$ |
| $CF_3Br$ | $CF_2Br_2$ | $CFBr_3$ |
| | $CF_2BrCl$ | $CFBrCl_2$ |
| | | $CFBr_2Cl$ |
| $CHFBrCl$ | $CHF_2Cl$ | $CHF_2Br$ |
| $ClCF_2CF_2Cl$ | $BrCF_2CF_2Br$ | $ClCF_2CF_2Br$ |
| $CF_3CFCl_2$ | $CF_3CFBr_2$ | $CF_3CFBrCl$ |
| $Cl_2CFCF_2Cl$ | | |
| $BrCF_2CF_2CF_2CF_2Br$ | $ClCF_2CF_2CF_2CF_2Cl$ | |
| $BrCF_2CF_2CF_2CF_2Cl$ | $Br(CF_2)_6Br$ | |
| $CF_3CFBrCF_2CF_3$ | $CF_3CFClCF_2CF_3$ | |
| $CF_3CFBrCFClCF_3$ | $CF_3CClFCClFCF_3$ | |
| $CF_3(CF_2)_7Br$ | $Br(CF_2)_8Br$ | $Cl(CF_2)_8Cl$ |
| $Cl_3C(CF_2)_2Cl$ | $Cl_3C(CF_2)_6Cl$ | $Cl(CF_2)_6H$ |
| $ClCF_2CFClCF_3$ | $BrCF_2CFBrCF_3$ | |

*Group III.*—Chloro-, bromo-, and fluoroalkenes containing at least one halogen other than fluorine.
Representatives:

| | |
|---|---|
| $CF_2=CFBr$ | $CF_2=CFCl$ |
| $BrCF=CFBr$ | $ClCF=CFCl$ |
| $CF_2=CBr_2$ | $CF_2=CCl_2$ |
| $CFBr=CBr_2$ | $CFCl=CCl_2$ |
| $CFBr=CHF$ | $CHCl=CBr_2$ |
| $CF_2=CHBr$ | $CHCl=CF_2$ |
| $CFBr=CHBr$ | $CHF=CHCl$ |
| $Cl_2C=CCl_2$ | $CH_2=CCl_2$ |
| $ClCH=CCl_2$ | $CH_2=CBr_2$ |
| $ClCH=CHCl$ | |
| $CH_2=CHCl$ | |
| $CF_2=CFCF_2Cl$ | $CF_2ClCF=CFCF_2Cl$ |
| $CF_2=CClCF_3$ | |
| $CCl_2=CFCF_3$ | $CF_2=CFCFClCF_2Cl$ |
| $CF_2=CFCCl_3$ | |
| $CF_2=CFCFCl_2$ | |
| $CCl_2=CClCF_3$ | |
| $CF_2=CHCF_2Br$ | $CF_2ClCH_2CH=CH_2$ |
| $CHCl=CFCF_2Cl$ | $CFCl=CHCH_2CH_3$ |
| $CCl_2=CHCF_2Cl$ | |
| $CH_2=CBrCF_3$ | |
| $CF_3CF_2CClFCF=CClF$ | |

*Group IV.*—Cyclicalkanes and cyclicalkenes containing at least one halogen other than fluorine.

$\overline{CCl_2-CCl_2-CF_2-CF_2-CF_2}$ $\overline{CF_2(CF_2)_4CFBr}$ $\overline{CFCl(CF_2)_4CF_2}$ $\overline{CFCl-CFCl-(CF_2)_3-CF_2}$  $\overline{CF_2CCl_2-CFCl-CCl=CCl}$ $\overline{CF_2-CFCl-CF_2CCl=CCl}$ $\overline{CF_2CFBrCFBrCF_2CF=CF}$ $\overline{CF_2CCl_2CCl_2CCl=CCl}$ $\overline{CF_2CCl_2CFClCCl=CCl}$ The process of this invention is also applicable to the fluorination of phenyl, halophenyl and halomethylphenyl substituted halomethanes such as

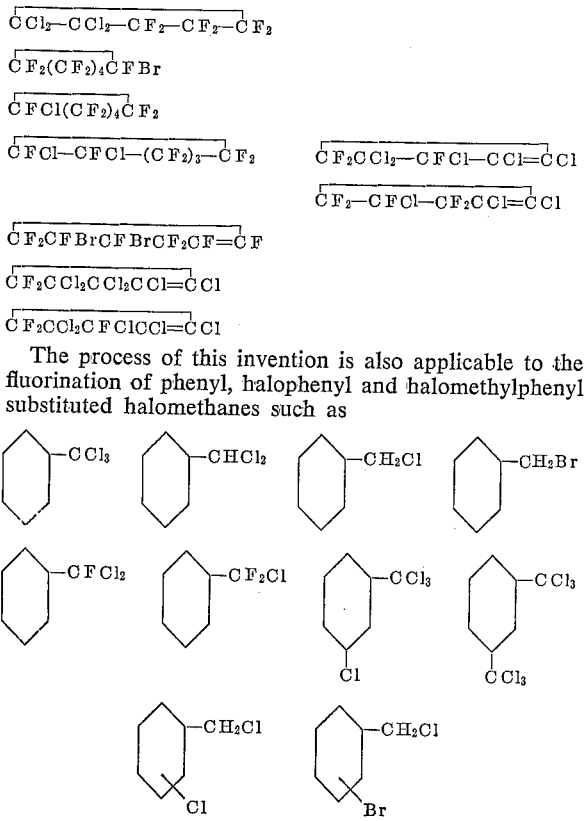

In the fluorination of these compounds, the halogens, other than fluorine, in the halomethyl groups are replaced by fluorine but the halogen substituents on the benzene ring remain intact.

By the process of this invention the chlorine and/or bromine of the halogenated hydrocarbons are partially or completely replaced by fluorine due to reaction with hydrogen fluoride to provide halogenated hydrocarbons which contain a higher proportion of fluorine than the starting material. In some cases, compounds, other than the products of direct replacement, are obtained in minor proportions as the result of secondary disproportionation reactions occurring in the process.

The catalysts employed in this process consist essentially of an activated anhydrous chromium (III) oxide. In other words, except for diluents, carriers, and minor proportions of impurities, they consist of $Cr_2O_3$ and have been activated by heating in an inert atmosphere at a temperature of from about 400° C. to about 600° C., preferably about 500° C. Inert atmospheres include nitrogen, air, steam, and anhydrous hydrogen fluoride, nitrogen being preferred. The catalysts are practically inert toward gaseous anhydrous hydrogen fluoride, oxidation by air, and reduction by hydrogen at the temperatures employed in this process. Treatment of the catalysts with gaseous anhydrous hydrogen fluoride for extended periods of time at such temperatures has not significantly affected their activity as catalysts and does not convert the $Cr_2O_3$ to an oxyfluoride, i.e., a basic chromium fluoride. For example, a representative activated chromium (III) oxide gel catalyst of this invention, after being used for 180 hours in the process of this invention, contained only 2.3% by weight of fluorine and was not converted to an oxyfluoride. This stability of the catalysts of this invention imparts to the catalyst a long, useful life which maintains the efficiency and lowers the cost of the fluorination process. While the catalysts of this invention consist essentially of activated anhydrous chromium (III) oxide (activated $Cr_2O_3$), they vary somewhat in activity with the source and the method of preparing the chromium (III) oxide.

The preferred catalyst for the process of this invention is the so-called gel-type activated chromium (III) oxide obtained by reducing chromium trioxide ($CrO_3$) and dehydrating the reduced product in the manner disclosed by Ruthruff in "Inorganic Syntheses," Vol. II, pp. 190–193, published in 1946 by McGraw-Hill Book Co., New York, and by Turkevich and Ruthruff in Patent 2,271,356. More particularly the preferred catalyst is prepared by dissolving chromium trioxide in water, gradually adding ethanol or other suitable reducing agent to the solution and heating under reflux conditions until the chromium oxide gel precipitates, separating the gel from the reaction mixture, drying it, and then dehydrating and activating the product by heating it at a temperature of from about 400° C. to about 600° C. in an inert atmosphere until the water is removed and an anhydrous product is obtained. The preferred process for preparing this "gel-type" catalyst is described in detail in part A of Example 1 given hereinafter. Analyses of several batches of catalysts so made and dehydrated at 500° C. under nitrogen have ranged between 67% and 68% chromium. One batch analyzed 68.3%, 68.4% chromium. The calculated amount of chromium in $Cr_2O_3$ was 68.5%.

The gel-type catalyst so produced is characterized by an exceptionally high activity whereby, for example, dichlorodifluoromethane and carbon tetrachloride, respectively, are converted to carbon tetrafluoride in a single step by reaction with hydrogen fluoride at from about 300° C. to about 600° C. and carbon tetrachloride is similarly converted to dichlorodifluoromethane at from about 150° C. to about 250° C. The activated anhydrous chromium (III) oxide gel catalyst as so prepared is generally of a particle size suitable for use as the fluorination catalyst in a tubular reactor. However, if desired, it may be passed through a screen or series of screens to obtain material having a particular range of particle size. The particularly convenient size is 10 mesh to 20 mesh, although particle sizes smaller and larger than this may be used. Also the dry catalyst may be pulverized and the resulting powder mixed with a suitable binding agent such as powdered polytetrafluoroethylene and pressed into pellets which may be used to form the catalyst bed for use in the process of this invention.

Another effective activated chromium (III) oxide catalyst of this invention, although somewhat less active than the gel-type activated chromium (III) oxide prepared from chromium trioxide, is the chromic oxide, $Cr_2O_3$, obtained by dehydrating the commercial pigment known as Guignet's Green, having the composition $Cr_2O_3 \cdot 2H_2O$ at from about 400° C. to about 600° C. in an inert atmosphere. The dehydration of Guignet's Green to prepare it for use as an activated fluorination catalyst is described in detail in Example 3 hereinafter. The Guignet's Green is preferably dehydrated and activated under nitrogen. When it is dehydrated at 500° C. with free access to air, it has less catalytic activity than when it is dehydrated in nitrogen. Whereas the nitrogen-dehydrated material gives high conversions of dichlorodifluoromethane to carbon tetrafluoride at 500° C., the air-dehydrated product converts dichlorodifluoromethane mainly to chlorotrifluoromethane at this temperature. The chromium oxide gel, made from chromium trioxide, does not exhibit this effect of contact with air during dehydration. Although the chromium oxide gel is commonly dehydrated under nitrogen, it may be dehydrated in air and retain its high catalytic activity so that dichlorodifluoromethane may still be converted to carbon tetrafluoride in its presence.

Another source of an activated catalytic chromium (III) oxide, for use in the fluorination of halogenated aliphatic compounds by the process of this invention, is water-soluble chromium (III) salts which are precipitated with ammonium or alkali metal hydroxide to yield chromium hydroxides that are washed and dehydrated to provide an activated chromic oxide. In Example 9 hereinafter, a description of a preferred mode of preparation of such such an activated chromium (III) oxide from chromium (III) chloride hydrate and ammonium hydroxide and the effect of its use in fluorinating dischlorodifluoromethane to chlorotrifluoromethane and carbon tetrafluoride are given. Besides chromium (III) chloride, other water-soluble chromium (III) salts, such as the acetate, nitrate, and sulfate, may be used. Besides ammonium hydroxide, sodium or potassium hydroxide may be used to precipitate the chromium in the form of its hydroxide from a water solution of one of its salts. After being washed to remove the extraneous ionic material and being dehydrated, the resulting activated chromium (III) oxide may be used as a fluorination catalyst in the process of this invention.

The various foregoing forms of activated chromium (III) oxide may be passed through sieves of suitable sizes to obtain a range of desired particle sizes, and the powdered material may be pressed into pellets with a binder such as polytetrafluoroethylene.

The activated chromium (III) oxide catalyst may be supported on an inert substrate, such as alumina, including the so-called "activated alumina." For example, alumina, in the form of spheres about ¼" to 1/16" in diameter or of irregular granules of about 8 to 15 mesh in size, may be mixed with a water solution of a chromium compound and the chromium oxide precipitated on the alumina, treating the alumina mixture essentially as the chromium solution is treated above to provide activated chromium (III) oxide in the absence of the alumina. For example, the alumina may be mixed with chromium trioxide and the trioxide reduced to an insoluble chromium oxide with ethanol or the alumina may be mixed with a solution of chromium (III) nitrate and chromium hydroxide precipitated with the ammonium hydroxide and the chromium hydroxide washed with water. The mixture will then be dehydrated to form activated chromium (III) oxide on the alumina. Catalysts, in the form of activated chromium (III) oxide admixed with aluminum oxide, are known to the art for use in the treatment of petroleum, particularly for the catalytic conversion of hydrocarbons and such catalysts may be used in the process of this invention, although they are somewhat less active and efficient than the catalyst prepared from the gels obtained in the reduction of chromium troxide and those prepared from Guignet's Green. Representative catalysts of this type and the methods for preparing them are disclosed by Thomas in Patent 2,402,854. A suitable catalyst of this type is the chrome-alumina catalyst made and distributed by The Harshaw Chemical Company for use in the petroleum industry, the use of which catalyst is illustrated in Example 10 given hereinafter.

For practical purposes, such as eliminating or minimizing the corrosion of equipment, anhydrous hydrogen fluoride is preferred. Small amounts of water, up to 0.1%, in the hydrogen fluoride can be tolerated, since gaseous hydrogen fluoride is fed to the reactor for the fluorination at an elevated temperature, and small amounts of water that might be carried into the reactor with the hydrogen fluoride are not deleterious. Commercial anhydrous hydrogen fluoride, which may contain traces of sulfur compounds, appears quite as satisfactory for the reaction as pure material.

The molar ratio of anhydrous hydrogen fluoride to the halogenated aliphatic hydrocarbon to be fluorinated may be varied over the range of 1 mole to 10 moles of hydrogen fluoride for each mole of the halogen compound, the preferred ratio being determined by the nature of the halogen compound to be fluorinated and by the amount of fluorination desired. In fluorinating carbon tetrachloride to carbon tetrafluoride, for example, 4 moles of hydrogen fluoride per mole of carbon tetrachloride are required. In converting vinyl chloride to vinyl fluoride, only one mole of hydrogen fluoride per mole of vinyl chloride is required. When the intent is to produce carbon tetrafluoride from carbon tetrachloride, a lower molar ratio of reactants than 4 moles of hydrogen fluoride per mole of carbon tetrachloride results in a decreased output of carbon tertafluoride and an increase in conversion to only partially fluorinated products such as chlorotrifluoromethane, dichlorodifluoromethane, and trichlorofluoromethane. Usually, an amount of hydrogen fluoride is used that is at least the stoichiometric amount needed for a given fluorination, preferably about a 50% molar excess.

The feed rate, expressed as parts by weight of halogenated aliphatic hydrocarbon (exclusive of hydrogen fluoride) per part of catalyst per hour, may vary from about 0.1 part to about 2.0 parts, with a feed rate of about 0.5 part being preferred. Since the fluorination is exothermic, the upper limit of the feed rate is determined by the efficiency of the dissipation of the heat of reaction from the reaction zone as well as by the reactivity and molecular weight of the halogenated aliphatic reactant. Too fast a feed rate may result in the generation of more heat than is withdrawn. Such a condition causes the catalyst temperature to rise, and the course of the reaction may change. Too slow a feed rate fails to use the total capacity of the catalyst and of the cooling system, resulting in low operation efficiency, and it could result in such a prolonged exposeure of the organic material to the elevated temperature that decomposition or undesirable alteration would occur.

The broad temperature range in which the fluorination of chloro or bromo aliphatic hydrocarbons may be effected with hydrogen fluoride is from about 150° C. to about 700° C. Narrower temperature ranges within these limits are found to be suitable for a selected degree of fluorination of a particular halogenated hydrocarbon and for a fluorination of a specific compound using a given type of form of activated chromium (III) oxide catalyst. For example, the essentially complete conversion of carbon tetrachloride to dichlorodifluoromethane occurs at 150° C. with the gel-type activated chromium (III) oxide catalyst prepared from chromium trioxide, while a similar conversion using activated chromium (III) oxide prepared from Guignet's Green requires a temperature of about 250° C. In brief, the temperature at which the process is run, other conditions being the same, depends upon the product that is desired from a given starting material that is to be fluorinated. Temperatures, below the preferred range for a particular product from a given material, result in low conversions and hence decreased efficiency of operation, and temperatures, above the preferred range, give rise to an over-fluorination for the desired product when over-fluorination is possible with the particular halohydrocarbon employed.

The new fluorination process is usually run at essentially atmospheric pressure or under the pressure induced by the hydraulic head of scrubbers and by beds of drying agents for a gas stream. The operation of the process need not be limited to these pressure conditions and the reaction may be run under super- or sub-atmospheric pressures.

In order to more clearly illustrate this invention, preferred modes of carrying the same into effect, and advantageous results obtained thereby, the following examples are given in which the proportions of materials employed and produced, are by volume except where specifically indicated otherwise.

EXAMPLE 1

(A) *Preparation of activated chromium (III) oxide gel catalyst*

A 12-liter round-bottom flask, equipped with an agitator, reflux condenser, and dropping funnel, is charged with 6 liters of distilled water and 480 g. of chromium trioxide ($CrO_3$). The mixture is stirred to dissolve the chromium trioxide and, with rapid agitation, 240 ml. of 95% ethanol is added in 30 ml. increments, each at a 5-minute interval. The solution is then allowed to stand for 3 hours, after which an additional 240 ml. of 95% ethanol is added in increments as before. The mixture is then heated to reflux and refluxed vigorously with agitation for 16 hours. During refluxing, chromium oxide gel precipitates. The mixture is cooled to room temperature and filtered in a 26 cm. Buchner funnel. Air is drawn through the filter cake until the cake becomes dry enough to crack. The filter cake is further dried in a vacuum oven for 48 hours to 60 hours at 40° C. to 50° C. and finally for 12 hours to 24 hours at 80° C. to 90° C. The product so obtained is dark brown-black and weighs about 500 g. Although it appears to be dry, it may contain 30% to 40% of water. This residual water is removed and the chromium oxide activated by heating the chromium oxide at 500° C. in a nitrogen atmosphere for about 7 hours. The dehydrated material is passed through sieves to obtain for use material that is between 10-mesh and 20-mesh in size. This preparation, except for passage of the material through the sieve and for changes in the drying and dehydrating procedure, is given in Inorganic Syntheses, Vol. II, pp. 190–193 (1946).

(B) *Fluorination of carbon tetrachloride at 150° C.*

Activated chromium (III) oxide gel (76.8 g.), prepared as described above, was placed in a 1″ internal diameter Hastelloy C reactor tube heated electrically and connected with a potassium hydroxide scrubber and with a drying tube containing successive beds of anhydrous soda lime, calcium chloride, and calcium sulfate. The catalyst was heated to 150° C., and a mixture of carbon tetrachloride and anhydrous hydrogen fluoride passed through the catalyst bed at the rate of 0.25 g. of carbon tetrachloride per gram of catalyst per hour and with a ratio of 8 to 9 moles of HF to each mole of $CCl_4$. The exit gases from the reactor were scrubbed with 10% potassium hydroxide solution, dried, and analyzed. The resulting gaseous product was found by mass spectrometry to comprise by volume 97% dichlorodifluoromethane and 2.1% chlorotrifluoromethane.

EXAMPLE 2

*Fluorination of carbon tetrachloride at 400° C.*

The procedure described in Example 1 was repeated except that the catalyst was heated to 400° C., the carbon tetrachloride feed rate was 0.2 g. $CCl_4$/g. catalyst/hr., and the $HF/CCl$, mole ratio was about 10/1. After scrubbing the gaseous effient from the reactor with 10% potassium hydroxide followed by drying, the remaining gas was found by mass spectrometry to consist of 94% carbon tetrafluoride and 3.2% chlorotrifluoromethane by volume.

When the $CCl_4$ feed rate was increased to 0.69 g. $CCl_4$/g. catalyst/hr. and the $HF/CCl_4$ mole ratio kept at about 8/1 while holding the catalyst temperature at 400° C., the scrubbed and dried gaseous product contained 94.5% carbon tetrafluoride and 5.2% chlorotrifluoromethane.

EXAMPLE 3

*Fluorination of carbon tetrachloride—catalyst from Guignet's Green*

An activated chromium (III) oxide catalyst, $Cr_2O_3$, was prepared by heating commercial Guignet's Green, ($Cr_2O_3 \cdot 2H_2O$) at 500° C. under a slow stream of nitrogen for a period of 7 hours.

A one-inch internal diameter Hastelloy C reactor was charged with 180 grams of 4 to 8 mesh activated chromium (III) oxide prepared as described in the preceding paragraph. Anhydrous hydrogen fluoride was passed through the catalyst at a rate 21 to 25 g./hr. for about 30 minutes at 500° C. and then cooled. Under an atmosphere of nitrogen, the catalyst was heated to 200° C. While holding the temperature of the catalyst between 198° C. and 204° C., a mixture of carbon tetrachloride and anhydrous hydrogen fluoride was fed to the reactor to supply 0.12 g. of $CCl_4$ per gram of catalyst per hour and about 8 moles of HF per mole of $CCl_4$. The gaseous effluent from the reactor was scrubbed with 10% potassium hydroxide solution and dried. A sample of the resulting gaseous product comprised 83.5% dichlorodifluoromethane, 15.3% trichlorofluoromethane, 0.6% chlorotrifluoromethane, and 0.6% nitrogen as determined by mass spectrometry.

When the $CCl_4$ feed to the reactor was increased to 0.31 g. $CCl_4$/g. catalyst/hr. and the $HF/CCl_4$ molar ratio was reduced to about 3/1, the scrubbed and dried gaseous product comprised 68.9% dichlorodifluoromethane, 30.6% trichlorofluoromethane, and 0.5% chlorotrifluoromethane.

EXAMPLE 4
*Fluorination of chloroform*

A one-inch internal diameter Hastelloy C reactor was charged with about 77 grams of the activated chromium (III) oxide catalyst prepared as described in Example 1 (A). The catalyst bed was heated to 400° C. in a nitrogen atmosphere. While maintaining the temperature at 400° C., a mixture of chloroform and anhydrous hydrogen fluoride was fed to the reactor to supply 0.5 g. $CHCl_3$/g. catalyst/hr. and about four moles of HF per mole of $CHCl_3$. The effluent product, after scrubbing and drying, comprised 96.2% trifluoromethane, 0.5% dichlorofluoromethane, 0.5% chlorodifluoromethane, and 0.3% chloroform as determined by mass spectrometry.

When the chloroform feed to the reactor was increased to 0.82 g. $CHCl_3$/g. catalyst/hr. while maintaining the $HF/CHCl_3$ mole ratio at about 4/1, the scrubbed and dried effluent gas still contained 96.2% trifluoromethane and small amounts of lesser fluorinated methanes.

EXAMPLE 5
*Fluorination of methyl chloride*

An activated chromium (III) oxide catalyst (73 g.), prepared as described in Example 1(A), was placed in a one-inch Hastelloy C reactor. The catalyst bed was maintained at a temperature of 250° C. while methyl chloride was fed to the reactor at a rate of 0.25 mole/hr. along with HF at a rate of 1.25 moles/hr. The effluent gas from the reactor was scrubbed with 10% KOH solution, dried, and analyzed by mass spectrometry. It was found to contain 6.5% of methyl fluoride and 89.7% of methyl chloride, along with small amounts of other organic compounds.

EXAMPLE 6
*Fluorination of dichlorodifluoromethane*

A Hastelloy C reactor one inch in internal diameter was charged with 70 grams of the activated chromium (III) oxide catalyst prepared as described in Example 1(A). A mixture of anhydrous hydrogen fluoride and dichlorodifluoromethane in a mole ratio of 4 to 1 was passed at different feed rates over the catalyst bed at different temperatures. The exit gases from the reactor were scrubbed with 10% potassium hydroxide solution and dried over anhydrous soda-lime, calcium chloride, and calcium sulfate. The variation in the composition of the effluent gases as determined by gas chromatography is shown in the following table.

| Temp. of catalyst, °C. | Feed rate, g. $CCl_2F_2$/g. catalyst/hr. | Composition of Product, percent by vol. | | |
|---|---|---|---|---|
| | | $CF_4$ | $CClF_3$ | $CCl_2F_2$ |
| 200 | 0.37 | | 67–76 | 33–24 |
| 300 | 0.37 | 67–68 | 33–32 | |
| 400 | 1.60 | 97 | ca. 3 | |
| 500 | 0.58 | 98 | (1) | |

1 Small amount.

These results show how the activity of the activated chromium (III) oxide catalyst is affected by temperature and how the degree to which the dichlorodifluoromethane becomes further fluorinated is controlled mainly by the temperature. The data show also that essentially quantitative replacement of the chlorine by fluorine is attained at 400° C. with a high feed rate or throughput of reactants.

At a temperature of 500° C., a mixture of anhydrous hydrogen fluoride and dichlorodifluoromethane in a mole ratio of about 4 to 1 was passed through the reactor with catalyst as described above at the rate of 0.35 g. $CCl_2F_2$/g. catalyst/hr. for a total period of 180 hours. Throughout the operation under these conditions, the dichlorodifluoromethane was 98% to 99% converted to carbon tetrafluoride.

In the absence of any catalyst, a mixture of anhydrous hydrogen fluoride and dichlorodifluoromethane in a mole ratio of 4 to 1 was passed through a 1″ x 30″ Hastelloy C reactor at 550° C. and at 600° C. at the rate of 0.25 gram mole of $CCl_2F_2$ per hour. The effluent product was scrubbed with 10% potassium hydroxide solution to remove hydrogen fluoride, dried, and analyzed in a mass spectrometer. At 550° C., the dichlorodifluoromethane was 10% converted to chlorotrifluoromethane and, at 600° C., the conversion was 35%. No carbon tetrafluoride was detected in the products.

EXAMPLE 7
*Fluorination of dichlorodifluoromethane—catalyst from Guignet's Green*

A one-inch internal diameter Hastelloy C reactor which contained 184 grams of 4 to 8 mesh Guignet's Green was heated at 500° C. for two hours under a slow stream of nitrogen to dehydrate the chromium oxide. A mixture of anhydrous hydrogen fluoride vapor and nitrogen was then passed through the reactor for two more hours with the temperature held at 500° C. At this temperature and at succeeding lower temperatures, dichlorodifluoromethane, at a rate of 0.25 gram-mole per hour, mixed with anhydrous hydrogen fluoride, at a rate of 1 gram-mole per hour, was passed through the reactor. The effluent gas from the reactor was scrubbed with 10% potassium hydroxide solution, dried, and analyzed by mass spectrometry. The results of the analyses are set forth in the following table.

| Temp. of catalyst, °C. | Composition of Product, percent by vol. | |
|---|---|---|
| | $CF_4$ | $CClF_3$ |
| 500 | 92 | 8 |
| 400 | 48 | 52 |
| 300 | | 99.7 |
| 200 | | Trace |

The complete exchange of the chlorine in dichlorodifluoromethane by fluorine is effected at about 500° C., while a partial replacement of the chlorine occurs at 300° C. to provide the single product chlorotrifluoromethane. Thus, merely by suitably changing the reaction temperature, essentially quantitative yields of trifluorochloromethane and tetrafluoromethane may be obtained as desired.

EXAMPLE 8
*Fluorination of dichlorodifluoromethane—reactivation of catalyst*

A one-inch internal diameter Hastelloy C reactor which contained 197 grams of 4 to 8 mesh Guignet's Green was heated to 500° C. and held at this temperature for about four hours under a stream of nitrogen. Then, for 98 hours continuous operation, dichlorodifluoromethane at a rate of 0.184 gram per gram of catalyst per hour was mixed with anhydrous hydrogen fluoride to provide 4 moles of HF per mole of $CCl_2F_2$ and passed through the reactor maintained at 500° C. The effluent gases from the reactor were scrubbed with 10% potassium hydroxide solution and dried. At intervals, samples of the scrubbed and dried product were collected and analyzed by gas chromatography with the following results.

| Time of sampling, in hours from start | Composition of Product, percent by vol. | |
|---|---|---|
| | $CF_4$ | $CClF_3$ |
| 1.5 | 78 | 22 |
| 5 | 85 | 15 |
| 12.5 | 88.5 | 11.5 |
| 32 | 86 | 14 |
| 70 | 80 | 20 |
| 81 | 76 | 24 |
| 92 | 71 | 29 |
| 98 | 62 | 38 |

The complete replacement of the chlorine by fluorine to form carbon tetrafluoride gradually diminishes, while a partial replacement to form chlorotrifluoromethane continues, and the decreased yield of the tetrafluoromethane is balanced by an increased yield of the trifluoro compound.

The activity of the catalyst, that is diminished by extended use as shown above, may be restored by treatment of the used catalyst with steam. One way in which the catalyst may be reactivated is illustrated by the following procedure. The dichlorodifluoromethane and hydrogen fluoride feeds to the reactor were shut off after the 98 hours' operation indicated above, and the catalyst was allowed to cool to room temperature under a slow stream of nitrogen. The catalyst was then heated to 200° C. to 300° C. and held in this temperature range for eight hours while subjected to the action of a slow stream of nitrogen saturated with water vapor at 75° C. Then the catalyst was heated to 500° C. and held at this temperature for five hours while about 100 g. of water in the form of steam mixed with nitrogen were passed through the reactor tube. Finally, nitrogen alone was passed over the catalyst for three hours. The dichlorodifluoromethane and hydrogen fluoride feeds to the reactor were then resumed at the same rate as before, while the catalyst was held at 500° C. The scrubbed and dried exit gases, after three hours further continuous operation, analyzed 93% carbon tetrafluoride and 7% chlorotrifluoromethane as compared with 62% $CF_4$ and 38% $CClF_3$ before reactivating the catalyst.

EXAMPLE 9

*Fluorination of dichlorodifluoromethane—catalyst from precipitated chromium hydroxide*

A chromium (III) oxide catalyst was prepared by precipitation of chromium hydroxide from a dilute aqueous solution (0.13 molar) of $CrCl_3 \cdot 6H_2O$ with a slight excess of 0.5 molar ammonium hydroxide. The ammonium hydroxide was added to the stirred solution of chromium chloride hydrate over a period of 5 hours. The precipitate was washed by decantation until it began to peptize, then it was filtered and dried under vacuum, first at 50° C. and finally at 100° C.

This material (70.8 g., about 8 to 20 mesh) was charged to a one-inch Hastelloy C reactor and dehydrated and activated at 400° C. under a slow flow of nitrogen for seven hours. Dichlorodifluoromethane was then fed to the reactor at a rate of 26 g./hr. along with anhydrous hydrogen fluoride at a rate of 17 g./hr. This feed rate is 0.37 g. $CCl_2F_2$/g. catalyst/hr. with about 4 moles of hydrogen fluoride per mole of $CCl_2F_2$. The catalyst bed temperature was held at about 400° C. After operating for 1.5 hrs., a sample of the off-gas from the reactor was collected, scrubbed with 10% KOH solution, dried over anhydrous calcium sulfate, and analyzed by mass spectrometry. This sample was found to contain 71.0% chlorotrifluoromethane, 28.2% tetrafluoromethane, and 0.8% dichlorodifluoromethane.

EXAMPLE 10

*Fluorination of dichlorodifluoromethane—chrome-alumina pellets*

A one-inch diameter Hastelloy C reactor tube was charged with 221 grams of chrome-alumina catalyst made by The Harshaw Chemical Company in the form of pellets of activated chromium (III) oxide and aluminum oxide. (Cr-0205 T 5/32" Spec. 102 580–218–45). This catalyst analyzed percent $Al_2O_3$—78.4, 79.0 and 78.5 and percent $Cr_2O_3$—19.6, 19.7, 19.2 and 19.2, and on heating for 2.5 hours at 600° C. lost 2.3 and 2.4% weight which apparently was moisture. The catalyst was heated and held at about 540° C. while dichlorodifluoromethane and hydrogen fluoride were fed to the reactor at rates of 0.36 mole/hr. and 0.95 mole/hr., respectively. The effluent gases from the reactor were scrubbed with 10% KOH solution and dried. Samples of the product, taken at intervals, showed the following analyses by mass spectrometry.

| Sample No. | 1 | 2 |
|---|---|---|
| Hrs. "on stream" | 2 | 2⅓ |
| Percent $ClCF_3$ | 76.5 | 81.8 |
| Percent $CF_4$ | 2.1 | |
| Percent $H_2$ | 14.3 | 15.2 |
| Percent $CO+N_2$ | 5.7 | 2.9 |
| Percent Air | 1.3 | |

EXAMPLE 11

*Fluorination of dichlorodifluoromethane—10' x 2" reactor*

A 6.9 lb. quantity of activated chromium (III) oxide catalyst, prepared as described in Example 1(A), was placed in a 10-foot by 2-inch Inconel reactor and heated to 500° C. Through the reactor, dichlorodifluoromethane was passed at an average rate of 2.95 lb. per hour together with an average input of 1.93 lb. per hour of anhydrous hydrogen fluoride for 80 hours' continuous operation with the temperature held between 500° C. and 550° C. The effluent gases from the reactor were passed through a counter-current water scrubber and through a 15% potassium hydroxide solution, dried over silica gel, and compressed into cylinders. The product, obtained in this way, comprised 99.6% carbon tetrafluoride, 0.2% chlorotrifluoromethane, less than 0.05% dichlorodifluoromethane, and 0.2% air as determined by gas chromatography. With a feed rate of dichlorodifluoromethane of 4.2 lb. per hour and 2.0 lb. per hour of hydrogen fluoride attained at one period of the operation, the scrubbed, dried, and compressed effluent gas still contained more than 99% carbon tetrafluoride.

EXAMPLE 12

*Fluorination of bromotrifluoromethane*

An activated chromium (III) oxide catalyst (53 g.), prepared as described in Example 1(A), was placed in a one-inch diameter Hastelloy C. reactor. The catalyst bed was heated to 500° C. and maintained at about that temperature while a mixture of anhydrous hydrogen fluoride and bromotrifluoromethane in a mole ratio of 4/1 to 5/1 was passed through the reactor at a rate of 0.5 g. $BrCF_3$/g. catalyst/hr. The effluent gases were scrubbed with 10% potassium hydroxide solution, dried, and analyzed by mass spectrometry. Analysis indicated that the effluent gas consisted of 95–98% of carbon tetrafluoride.

EXAMPLE 13

*Fluorination of 1,1,2-trichloro-1,2,2-trifluoroethane*

An activated chromium (III) oxide catalyst (53 g.), prepared as described in Example 1(A), was placed in a one-inch diameter Hastelloy C reactor. The catalyst was held at 310° C.–320° C. while 20 g./hr. of anhydrous hydrogen fluoride and 25 g./hr. of 1,1,2-trichloro-1,2,2-trifluoroethane were passed together through the reactor. The effluent gases from the reactor were scrubbed with 10% KOH solution, dried, and analyzed by mass spectrometry. The analysis showed a composition of 79.8% dichlorotetrafluoroethane, 17.5% trichlorotrifluoroethane, 0.7% hexafluoroethane and small quantities of other fluoro compounds.

EXAMPLE 14

*Fluorination of 1,2-dichlorotetrafluoroethane*

Eighty-three grams of an activated chromium (III) oxide, prepared as described in Example 1(A) and having a particle size larger than 80 mesh, was placed in a one-inch Hastelloy C reactor to form a catalyst bed for the fluorination of 1,2-dichlorotetrafluoroethane with anhydrous hydrogen fluoride. While maintaining the catalyst at fixed elevated temperatures, a mixture of HF and $CClF_2CClF_2$ in a mole ratio of 4/1 to 5/1 was passed through the reactor at the rate of 0.5 g. of $CClF_2CClF_2$/g. catalyst/hr. The effluent gases were scrubbed with 10% potassium hydroxide solution, dried, and analyzed. The results are summarized below.

| Temp. of catalyst, ° C. | Composition of Product, percent by vol. | |
|---|---|---|
| | $CF_3CF_3$ | $CClF_2CF_3$ |
| 400 | 13 | 67 |
| 500 | 90 | 6.5 |
| 550 | 94 | 4 |

The analyses for the runs at 400° C. and 500° C. were made by gas chromatography and that for the run at 550° C. was made by mass spectroscopy.

EXAMPLE 15

*Fluorination of 1,2-dichlorotetrafluoroethane—10' x 2" reactor*

A 10-foot by 2-inch Inconel reactor was charged with 8 lb. of oven-dried chromium (III) oxide gel prepared as described in Example 1(A). This material was further dehydrated by heating at 500° C. under a slow flow of nitrogen to provide 5.7 lb. of dry activated chromium (III) oxide catalyst. The catalyst was held at a temperature of 400° C. to 425° C. while 1,2-dichlorotetrafluoroethane was fed to the reactor at an average rate of 2.35 lb./hr. together with anhydrous hydrogen fluoride, fed at an average rate of 1.44 lb./hr. The effluent gases from the reactor were passed through a counter-current water scrubber and a 15% KOH solution and dried over silica gel. The dried product was collected by condensation in a steel cylinder cooled by immersion in a bath of solid carbon dioxide-trichloroethylene. During a period of 57 hours' intermittent operation, 133 lb. of 1,2-dichlorotetrafluoroethane was fed to the reactor. The weight of product collected was 109.6 lb. The product, analyzed by gas chromatography, comprised:

| | Percent |
|---|---|
| Chloropentafluoroethane | 69.8 |
| Hexafluoroethane | 17.0 |
| 1,2-dichlorotetrafluoroethane | 13.2 |

This amounts to a 91% yield of fluorinated products which may readily be separated by distillation.

EXAMPLE 16

*Fluorination of 1,2-dichlorotetrafluoroethane—catalyst as pellets*

(A) PELLETIZED CHROMIUM OXIDE GEL CATALYST

Chromium (III) oxide, prepared as described in Example 1(A) and passed through a 20-mesh screen, was mixed with 2% of its weight of powdered polytetrafluoroethylene resin and pressed into 3/16" pellets. The pellets were then placed in a Hastelloy C reaction tube one inch in diameter and heated slowly to 250° C. under a stream of nitrogen over a period of four hours. With a continued flow of nitrogen, the temperature was held at 250° C. for two hours and then raised to 500° C. over a period of seven hours and held at 500° C. for seven hours. The pellets were cooled to room temperature, removed from the reactor, and sieved to remove the fine particle dusty material.

(B) FLUORINATION OF 1,2-DICHLOROTETRA-FLUOROETHANE

Eighty-three grams of the activated chromium (III) oxide pellets, prepared as described above, were placed as a catalyst bed in a one-inch diameter Hastelloy C reactor and heated to 400° C. A mixture of anhydrous hydrogen fluoride and $CClF_2CClF_2$ in a mole ratio of 4/1 to 5/1 was then passed through the reactor at the rate of about 0.5 g. of $CClF_2CClF_2$/g. catalyst/hr. The effluent gases were scrubbed with 10% potassium hydroxide solution, dried, and sampled for analysis by mass spectrometry. The procedure was repeated maintaining the catalyst temperature at 500° C. The compositions of the product gases were:

| Temp. of catalyst, ° C. | Composition of Product, percent by vol. | | |
|---|---|---|---|
| | $CF_3CF_3$ | $CClF_2CF_3$ | $CClF_2CClF_2$ |
| 400 | 8.8 | 51.4 | 38 |
| 500 | 85.2 | 10.5 | |

The marked effect of raising the temperature from 400° C. to 500° C. on the yield hexafluoroethane is clearly shown.

EXAMPLE 17

*Fluorination of tetrachloroethylene*

An activated chromium (III) oxide catalyst (146 g.), prepared as indicated in Example 1(A), was placed in a one-inch Hastelloy C reactor. The catalyst bed was heated and maintained at a temperature of about 400° C. while tetrachloroethylene was fed to the reactor at a rate of 33.5 g./hr. along with anhydrous hydrogen fluoride at a rate of 25 g./hr. The gaseous effluent from the reactor was scrubbed with 10% KOH and dried over anhydrous calcium sulfate. Analysis by mass spectrometry showed this material to contain 35.0% pentafluoroethane, 9.2% 1-chloro-1,2,2,2-tetrafluoroethane, and 3.5% 1,1-dichloro-2,2,2-trifluoroethane, along with other materials.

When the catalyst temperature was held at about 300° C. and feeds to the reactor were maintained as indicated above, the gaseous effluent after rectification was found to contain 38.3% of 1-chloro-1,2,2,2-tetrafluoroethane, 25.4% of pentafluoroethane, 16.0% of 1,1-dichloro-2,2,2-trifluoroethane, and small quantities of other fluorinated products.

EXAMPLE 18

*Fluorination of vinylidene chloride*

Activated chromium (III) oxide of greater than 40-mesh in size, prepared as described in Example 1(A), was charged in an amount of 113 grams into a one-inch Hastelloy C reactor tube and heated to 400° C. A mixture of anhydrous hydrogen fluoride and vinylidene chloride ($CH_2=CCl_2$) was passed through the reactor at different feed rates. Samples of the exit gases, scrubbed with 10% potassium hydroxide and dried, analyzed by mass spectrometry as follows:

| Mole ratio of $HF/CH_2=CCl_2$ | Feed rate, g. $CH_2=CCl_2$/g. catalyst/hr. | Composition of Product, Percent by vol. | | | |
|---|---|---|---|---|---|
| | | $CH_3CF_3$ | $CH_2=CF_2$ | $CHCl=CHF$ | $CH_2=CCl_2$ |
| 2/1 | 0.5 | 46.7 | 3.1 | 9.2 | 38.6 |
| 4/1 | 0.25 | 71.2 | 1.2 | 4.5 | 20.5 |

A slower feed rate has materially increased the conversion to 1,1,1-trifluoroethane.

EXAMPLE 19

*Fluorination of vinyl chloride*

Following the fluorination of 1,2-dichlorotetrafluoroethane in the reactor as described in Example 14, the catalyst was cooled under nitrogen to room temperature. Then the catalyst was reheated and while being held at fixed elevated temperatures a mixture of anhydrous hydrogen fluoride and vinyl chloride in a mole ratio of about 5 to 1 was passed through the reactor at the rate of 0.16 g. $CH_2=CHCl$/g. catalyst/hr. The effluent gases were scrubbed with 10% potassium hydroxide solution, dried, and analyzed by mass spectrometry. The results are summarized below.

| Temp. of catalyst, °C. | Composition of Product, Percent by vol. | | |
|---|---|---|---|
| | $CH_3CHF_2$ | $CH_2=CHF$ | $CH_2=CHCl$ |
| 300–350 | 32.2 | 13.7 | 52.2 |
| 400 | 3.7 | 30.5 | 58.6 |

The product from the reactor at 300° C.–350° C. contained also a small amount of 1-chloro-1-fluoroethane.

EXAMPLE 20

*Fluorination of chlorotrifluoroethylene*

A one-inch Hastelloy C reactor was charged with 75 g. of an activated chromium (III) oxide gel catalyst, prepared as described in Example 1(A). The catalyst bed was heated to about 400° C., and chlorotrifluoroethylene was fed to the reactor at a rate of 25 g./hr. along with anhydrous hydrogen fluoride at a rate of about 25 g./hr. The off-gases from the reactor were scrubbed with 10% KOH and dried over anhydrous calcium sulfate. After operating for an hour, a sample of the off-gas was collected and analyzed by mass spectrometry. The sample was found to contain 26.8% of pentafluoroethane along with smaller quantities of chlorofluoro- and fluoroethanes and ethylenes.

EXAMPLE 21

*Fluorination of 1,1,1,3-tetrachloro-2,2,3,3-tetrafluoropropane*

An activated chromium (III) oxide catalyst (77 g.), prepared as described in Example 1(A), was placed in a one-inch diameter Hastelloy C reactor. The reactor was connected at its bottom end to a 500 ml. copper pot which was immersed in an ice bath. The catalyst bed was maintained at a temperature of 200° C. while 25 g./hr. of anhydrous hydrogen fluoride together with 28 g./hr. of 1,1,1,3-tetrachloro-2,2,3,3-tetrafluoropropane were fed to the reactor. A total of 47 g. of the tetrachlorotetrafluoropropane was fed to the reactor over a period of 100 minutes. The feeds were then shut off, the reactor was purged with nitrogen and the liquid products, which had collected in the copper pot, were poured onto 200 g. of ice. The mixture was stirred and neutralized with potassium hydroxide. The water-insoluble organic phase (30.1 g.) was drawn off and distilled through a small spinning band distillation column. It boiled at 72° C.–73° C. The product so collected was identified as 1,1,3-trichloro-1,2,2,3,3-pentafluoropropane by the following analyses:

| | Product (Found) | $Cl_2CFCF_2CF_2Cl$ |
|---|---|---|
| Refractive Index | $1.3513^{20°}$ | $1.3578^{25°}$ |
| Density | $1.6445^{20}_{20}$ | $1.6429^{25°}$ |
| Molecular Weight | 233, 237 | 237.35 |
| Percent Chlorine | 44.3, 44.5 | 44.8 (ca.) |
| Percent Fluorine | 40.0, 40.1 | 40.0 (ca.) |
| Percent Carbon | 15.1, 15.3 | 15.16 (ca.) |

When the catalyst temperature was held at 400° C. and 25 g. to 35 g./hr. of anhydrous hydrogen fluoride together with 24 g./hr. of the tetrachlorotetrafluoropropane were fed, no liquid organic product was collected. The gaseous effluent from the reactor was scrubbed with 10% KOH, dried, and analyzed by gas chromatography. It was found to consist of about 20% perfluoropropane, about 80% 1-chloroheptafluoropropane and small quantities of other unidentified materials.

When the catalyst temperature was held at 500° C., and feeds to the reactor were maintained as given immediately above, the gaseous effluent from the reactor was found by gas chromatography to contain about 40% of perfluoropropane along with some 1-chloroheptafluoropropane and other unidentified materials.

EXAMPLE 22

*Fluorination of 1,2-dichlorohexafluoropropane*

Chromium oxide gel (10 lb.), prepared with oven drying as described in Example 1(A), was further dehydrated at 500° C. in a 10-foot x 2-inch Inconel reactor under a slow stream of nitrogen to yield 6.9 lb. of activated catalyst. The catalyst bed temperature was adjusted to about 425° C. before 1,2-dichlorohexafluoropropane was metered to the reactor at 0.44 lb./lb. catalyst/hr. together with sufficient anhydrous hydrogen fluoride to maintain a $HF/CF_3CHClCF_2Cl$ molar ratio of 5/1 in the feed stream. The gaseous effluent from the reactor was scrubbed first with water and then with 10% potassium hydroxide solution, dried over silica gel, and condensed in a cold receiver. The water and potassium hydroxide scrubbers and the drying tube were maintained at 45° C. The yield, based on recovered organic products, was 96.7%. The composition of the product, determined by gas chromatography was:

| | Percent |
|---|---|
| 2-chloroheptafluoropropane | 78 |
| Octafluoropropane | 1 |
| 1,2-dichlorohexafluoropropane | 21 |

An organic feed, consisting of 80% by volume of 2-chloroheptafluoropropane and 20% by volume of 1,2-dichlorohexafluoropropane, was then metered to the reactor at 0.22 lb./lb. catalyst/hr. along with sufficient hydrogen fluoride to maintain a hydrogen fluoride/organic composition molar ratio of 4/1 and the temperature of the catalyst bed was increased slowly from 450° C. to 625° C. The conversion to octafluoropropane, determined by gas chromatography analysis of the scrubbed and dried reactor effluent, was:

| Reactor Temperature, ° C. | Vol. percent $CF_3CF_2CF_3$ in effluent gas |
|---|---|
| 490–520 | 17 |
| 520–535 | 28 |
| 535–575 | 50 |
| 575–610 | 70 |
| 610–625 | 80 |

EXAMPLE 23

*Fluorination of 2,3-dichlorooctafluorobutane*

Into a ¾" Hastelloy C reactor tube was charged 186 g. of chromium oxide gel catalyst, prepared with oven drying as descirbed in Example 1(A), and dehydrated in the reactor at 500° C. under a slow stream of nitrogen. The temperature of the catalyst was then adjusted to 450° C., and 2,3-dichlorooctafluorobutane was metered to the reactor at 0.30 g./g. catalyst/hr. along with sufficient anhydrous hydrogen fluoride to maintain an $HF/C_4F_8Cl_2$ mole ratio of 4.5/1 in the feed stream. The reactor effluent was scrubbed with 15% KOH, dried over silica gel and condensed in a cold trap. The scrubber and drying tube were maintained at 65° C. About 95 g. of $C_4F_8Cl_2$ was fed to the reactor before the experiment was terminated. The cold trap contained 68 g. of product which was shown by gas chromatography to have the following composition.

| | Percent |
|---|---|
| $C_4F_{10}$ | 10 |
| $C_4F_9Cl$ | 38 |
| $C_4F_8Cl_2$ | 37 |
| Unidentified | 15 |

EXAMPLE 24

*Fluorination of 1,4-dibromooctafluorobutane*

In a Hastelloy C reactor, 126.5 g. of chromium oxide, prepared with oven drying as described in Example 1(A), was further dehydrated under a slow stream of nitrogen at 500° C. to provide 88 g. of anhydrous activated catalyst. The catalyst temperature was adjusted to 350° C., and 1,4-dibromooctafluorobutane was metered at 0.57 g./g. catalyst/hr. along with sufficient hydrogen fluoride to maintain an $HF/C_4F_8Br_2$ mole ratio of 4/1. The reactor effluent was scrubbed in 15% KOH, dried over silica gel and condensed in a cold trap. The scrubber and drying tube were maintained at 50° C. Unconverted starting material, collected in a trap maintained at 50° C. and connected to the bottom of the reactor, was combined with the condensed products from the drier for analysis. Analysis by gas chromatography indicated that the product had the following composition.

| | Percent |
|---|---|
| $C_4F_{10}$ | 5 |
| $C_4F_9Br$ | 60 |
| $C_4F_8Br_2$ | 30 |
| Unidentified | 5 |

The catalyst temperature was then increased to 500° C. with the same feed conditions. Gas chromatography analysis of the scrubbed reactor effluent indicated that decafluorobutane was now formed in an amount of about 50% of the product.

EXAMPLE 25

*Fluorination of 1,1,1,7-tetrachlorododecafluoroheptane*

An activated chromium (III) oxide gel catalyst (100 g.), prepared as described in Example 1(A), was placed in a one-inch diameter Hastelloy C reactor. The reactor was connected at its bottom end to a 500 ml. copper pot which was immersed in an ice bath. The catalyst bed was maintained at a temperature of about 400° C. while 25 g./hr. of anhydrous hydrogen fluoride together with about 12 g./hr. of 1,1,1,7-tetrachlorododecafluoroheptane was fed to the reactor. A total of 49 g. of the tetrachlorododecafluoroheptane was fed to the reactor over a period of about four hours. The feeds were then shut off, the reactor was purged with nitrogen and the liquid products which had collected in the copper pot were poured onto 200 g. of ice. The water insoluble organic phase was drawn off, washed with 5% sodium bicarbonate solution and dried over anhydrous calcium sulfate. The dried material was filtered to remove the drying agent, and distilled through a small spinning band distillation column. There was obtained a 51% yield of perfluoroheptane containing a small amount of a lesser fluorinated derivative and identified by the following analysis.

Calculated for $C_7F_{16}$: C—21.6%, F—78.4%. Found: C—20.6%, F—77.5%.

Boiling point: Lovelace et al.:[1] 82° C. Observed: 82° C.

In addition, there was obtained a 36% yield of chloropentadecafluoroheptane identified by the following analysis.

Calculated for $C_7F_{15}Cl$: C—20.8%, Cl—8.8%, F—70.5%. Found: C—20.9%, Cl—8.5%, F—70.7%.

Boiling point: 109° C.

EXAMPLE 26

*Fluorination of 1,6-dibromododecafluorohexane*

An activated chromium (III) oxide gel catalyst (89 g.), prepared as described in Example 1(A), was placed in a ¾" diameter Hastelloy C reactor. To the bottom of the reactor was connected a 500 ml. copper receiver immersed in an ice bath. While maintaining the catalyst temperature at 350° C., 1,6-dibromododecafluorohexane was passed through the reactor at a rate of 100 g./hr. together with anhydrous hydrogen fluoride to give an $HF/C_6F_{12}Br_2$ mole ratio of 2/1. The product that collected in the copper receiver was poured into ice water. The separated organic layer was withdrawn, washed with dilute sodium bicarbonate solution, and dried. Gas chromatography analysis of the product revealed the following composition.

| | Percent |
|---|---|
| $C_6F_{14}$ | 19.4 |
| $C_6F_{13}Br$ | 7.6 |
| $C_6F_{12}Br_2$ | 69.6 |
| Unidentified | 3.4 |

---
[1] Aliphatic Fluorine Compounds, Reinhold Pub. Co., 1958, p. 75.

EXAMPLE 27

*Fluorination of 1,2,4-trichloropentafluorocyclopentene*

An activated chromium (III) oxide gel catalyst (100 g.), prepared as described in Example 1(A), was placed in a one-inch diameter Hastelloy C reactor. The reactor was connected at its bottom end to a 500 ml. copper pot which was immersed in an ice bath. The catalyst bed was heated and maintained at a temperature of about 400° C. while anhydrous hydrogen fluoride at about 25 g./hr. and 1,2,4-trichloropentafluorocyclopentene at about 28 g./hr. were fed to the reactor. The reaction was continued in this way for a period of 2.5 hours. The feeds were then turned off, the reactor was purged with nitrogen, and the liquid products which had collected in the copper pot were poured onto 200 g. of ice. The water insoluble organic phase was drawn off, washed with 5% sodium bicarbonate solution, and dried over anhydrous calcium sulfate. The dried product was filtered and distilled through a small spinning band column. Three main distillation cuts were obtained.

| | G. |
|---|---|
| Cut #1, boiling range, 45° C.–88° C. | 3.9 |
| Cut #2, boiling range, 88° C.–89° C. | 27.0 |
| Cut #3, boiling range, 89° C.–116° C. | 3.5 |

Cut #2 is 1,2-dichlorohexafluorocyclopentene as identified by nuclear magnetic resonance and chemical analysis.

Calculated for $C_5F_6Cl_2$: C—24.5%, F—46.5%, Cl—24.5%. M.W.—245. Found: C—24.2%, F—46.3%, Cl—24.2%, M.W.—250.

EXAMPLE 28

*Fluorination of α,α,α-trichlorotoluene*

A one-inch Hastelloy C reactor was charged with 94 g. of chromium oxide gel catalyst prepared as described in Example 1(A). The reactor was connected at its bottom end to a 500 ml. copper receiver immersed in an ice bath. The catalyst was heated to 400° C., and a mixture of anhydrous hydrogen fluoride and dry nitrogen was passed through the reactor for 30 minutes. Then 62.5 g. of α,α,α-trichlorotoluene was fed to the reactor over a period of 1.5 hrs. together with anhydrous hydrogen fluoride at an average rate of 20 to 25 g. per hr. while maintaining the temperature of the catalyst at 400° C. The product of the reaction and excess hydrogen fluoride which collected in the copper receiver were poured onto about 200 g. of ice and stirred briefly. On standing, a water-insoluble lower layer separated. This layer was drawn off, washed with a 5% solution of sodium acid carbonate, dried over anhydrous calcium sulfate, and distilled. A product having a boiling point of 100° C., and amounting to 15.3 g. was identified by molecular weight determination and chemical analysis as α,α,α-trifluorotoluene.

Calculated for $C_7H_5F_3$: M.W.—146, F—39.%, Cl—0.0%. Found: M.W.—146, 149, F—39.%, 39.3%, Cl—0.2%.

The data of the examples are summarized below in tabular form for the purpose of providing a convenient reference thereto. In that summary, Gel designates the catalyst obtained from the chromium oxide gel resulting from the reduction of $CrO_3$ with ethanol; GG designates the catalyst prepared from Guignet's Green; —OH ppt. designates the catalyst prepared from chromium hydroxide precipitated from $CrCl_3$ with ammonia. Also, the volume percent of particular products in the gaseous products are indicated in parentheses ( ).

SUMMARY OF EXAMPLES

| Ex. | Reactant with HF | Form of $Cr_2O_3$ Catalyst | Temp. of Catalyst, °C. | Main Products |
|---|---|---|---|---|
| 1 | $CCl_4$ | Gel | 150 | $CCl_2F_2$ (97). |
| 2 | $CCl_4$ | Gel | 400 | $CF_4$ (94). |
| 3 | $CCl_4$ | GG | 200 | $CCl_2F_2$ (84), $CCl_3F$ (15). |
| 4 | $CHCl_3$ | Gel | 400 | $CHF_3$ (96). |
| 5 | $CH_3Cl$ | Gel | 250 | $CH_3F$ (6.5). |
| 6 | $CCl_2F_2$ | Gel | 200 | $CClF_3$ (ca. 70). |
| | $CCl_2F_2$ | Gel | 300 | $CF_4$ (67), $CClF_3$ (33). |
| | $CCl_2F_2$ | Gel | 400 | $CF_4$ (97). |
| | $CCl_2F_2$ | Gel | 500 | $CF_4$ (>98). |
| | $CCl_2F_2$ | No catalyst | 550 | $CClF_3$ (10). |
| | $CCl_2F_2$ | ----do---- | 600 | $CClF_3$ (35). |
| 7 | $CCl_2F_2$ | GG | 200 | $CClF_3$ (Trace). |
| | $CCl_2F_2$ | GG | 300 | $CClF_3$ (99). |
| | $CCl_2F_2$ | GG | 400 | $CClF_3$ (52), $CF_4$ (48). |
| | $CCl_2F_2$ | GG | 500 | $CF_4$ (92), $CClF_3$ (8). |
| 8 | $CCl_2F_2$ | GG | 500 | $CF_4$ (62 to 89), $CClF_3$ (38 to 11). |
| | $CCl_2F_2$ | GG, reactivated | 500 | $CF_4$ (93–43), $CClF_3$ (7–57). |
| 9 | $CCl_2F_2$ | —OH ppt | 400 | $CClF_3$ (71), $CF_4$ (28). |
| 10 | $CCl_2F_2$ | Chrome-Alumina pellets | 540 | $CClF_3$ (79). |
| 11 | $CCl_2F_2$ | Gel in 10' x 2" reactor | 500–550 | $CF_4$ (99). |
| 12 | $CBrF_3$ | Gel | 500 | $CF_4$ (98). |
| 13 | $CCl_2FCClF_2$ | Gel | 315 | $C_2Cl_2F_4$ (80), $CF_3CF_3$ (0.7). |
| 14 | $CClF_2CClF_2$ | Gel | 400 | $CClF_2CF_3$ (67), $CF_3CF_3$ (13). |
| | $CClF_2CClF_2$ | Gel | 500 | $CF_3CF_3$ (90), $CClF_2CF_3$ (6.5). |
| | $CClF_2CClF_2$ | Gel | 550 | $CF_3CF_3$ (92), $CClF_2CF_3$ (4). |
| 15 | $CClF_2CClF_2$ | Gel in 10' x 2" reactor | 400–425 | $CClF_2CF_3$ (70), $CF_3CF_3$ (17). |
| 16 | $CClF_2CClF_2$ | Gel, pellets | 400 | $CClF_2CF_3$ (51), $CF_3CF_3$ (9). |
| | $CClF_2CClF_2$ | ----do---- | 500 | $CF_3CF_3$ (85), $CClF_2CF_3$ (11). |
| 17 | $CCl_2=CCl_2$ | Gel | 400 | $CHF_2-CF_3$ (35), $CHClFCF_3$ (9). |
| 18 | $CH_2=CCl_2$ | Gel | 400 | $CH_3CF_3$ (47, 71). |
| 19 | $CH_2=CHCl$ | Gel | 300–350 | $CH_3CHF_2$ (32), $CH_2=CHF$ (14). |
| | $CH_2=CHCl$ | Gel | 400 | $CH_2=CHF$ (31), $CH_3CHF_2$ (4). |
| 20 | $CClF=CF_2$ | Gel | 400 | $CHF_2CF_3$ (27). |
| 21 | $CCl_3CF_2CF_2Cl$ | Gel | 200 | $CCl_2FCF_2CF_2Cl$. |
| 22 | $CF_3CClFCClF_2$ | Gel | 425 | $CF_3CClFCF_3$ (78), $C_3F_8$ (1). |
| | $CF_3CClFCF_3$ (80) | }Gel | 490–625 | $C_3F_8$ (17 to >80). |
| | $CF_3CClFCClFCF_3$ (20) | | | |
| 23 | $CF_3CClFCClFCF_3$ | Gel | 450 | $C_4F_9Cl$ (38), $C_4F_{10}$ (10). |
| 24 | $BrCF_2CF_2CF_2CF_2Br$ | Gel | 350 | $C_4F_9Br$ (60), $C_4F_{10}$ (5). |
| 25 | $Cl_3C(CF_2)_5CF_2Cl$ | Gel | 500 | $C_4F_{10}$ (50). |
| 26 | $BrCF_2(CF_2)_4CF_2Br$ | Gel | 400 | $C_7F_{16}$ (50), $C_7F_{15}Cl$ (36). |
| 27 | $CF_2CClFCF_2CCl=CCl$ | Gel | 350 | $C_6F_{14}$ (19), $C_6F_{13}Br$ (8). |
| | | | 400 | Cyclic $C_5F_6Cl_2$. |
| 28 | ⬡—$CCl_3$ | Gel | 400 | ⬡—$CF_3$. |

It will be understood that the preceding examples are given for illustrative purposes solely and that this invention is not limited to the specific embodiments described therein. On the other hand, it will be readily apparent to those skilled in the art that, subject to the limitations set forth in the general description, many variations can be made in the materials, the proportions, the conditions, and the techniques employed, without departing from the the spirit or scope of this invention.

From the preceding description, it will be apparent that this invention provides a new and improved process for preparing a wide variety of valuable products, particularly many compounds which heretofore were difficult and expensive to produce. The process is simple, economical, and easy to operate and control so as to produce selected products as desired. Particularly, it produces exceptionally high yields of the desired products, especially of compounds which could not heretofore be produced except with difficulty and at high cost. Accordingly, it will be apparent that this invention constitutes a valuable contribution to and advance in the art.

The embodiments of the invention in which an exclusive property or privilege is claimed are defined as follows:

1. The process for fluorinating halohydrocarbons which comprises contacting a vapor mixture of a halogenated aliphatic hydrocarbon of 1 to 8 carbon atoms in which adjacent carbons are linked solely by 1 to 2 valence bonds and in which the halogen atoms have an atomic weight of less than 80 and include at least one halogen atom having an atomic weight between 35 and 80 and at least a stoichiometric proportion of anhydrous hydrogen fluoride with a catalyst which consists essentially of an activated anhydrous chromium (III) oxide at a temperature in the range of from about 150° C. to about 700° C. such that the principal reaction is the substitution of fluorine for other halogen of the halogenated hydrocarbon, and separating the fluorinated compound from the reaction mixture.

2. The process for fluorinating halohydrocarbons which comprises contacting a vapor mixture of a halogenated acyclic hydrocarbon of 1 to 8 carbon atoms in which adjacent carbons are linked solely by 1 to 2 valence bonds and in which the halogen atoms have an atomic weight of less than 80 and include at least one halogen atom having an atomic weight between 35 and 80 and at least a stoichiometric proportion of anhydrous hydrogen fluoride with a catalyst which consists essentially of an activated anhydrous chromium (III) oxide at a temperature in the range of from about 150° C. to about 700° C. such that the principal reaction is the substitution of fluorine for other halogen of the halogenated hydrocarbon, and separating the fluorinated compound from the reaction mixture.

3. The process for fluorinating halohydrocarbons which comprises contacting a vapor mixture of a halogenated saturated hydrocarbon of 1 to 8 carbon atoms in which the halogen atoms have an atomic weight of less than 80 and include at least one halogen atom having an atomic weight between 35 and 80 and at least a stoichiometric proportion of anhydrous hydrogen fluoride with a catalyst which consists essentially of an activated anhydrous chromium (III) oxide at a temperature in the range of from about 150° C. to about 700° C. such that the principal reaction is the substitution of fluorine for other halogen of the halogenated hydrocarbon, and separating the fluorinated compound from the reaction mixture.

4. The process for fluorinating halohydrocarbons which comprises contacting a vapor mixture of a halogenated saturated acyclic hydrocarbon of 1 to 8 carbon atoms in which the halogen atoms have an atomic weight of less than 80 and include at least one halogen atom having an atomic weight between 35 and 80 and at least a stoichiometric proportion of anhydrous hydrogen fluoride with a catalyst which consists essentially of an activated anhydrous chromium (III) oxide at a temperature in the range of from about 150° C. to about 700° C. such that the principal reaction is the substitution of fluorine for other halogen of the halogenated hydrocarbon, and separating the fluorinated compound from the reaction mixture.

5. The process for fluorinating halohydrocarbons which comprises contacting a vapor mixture of a completely halogenated saturated acyclic hydrocarbon of 1 to 8 carbon atoms in which the halogen atoms have an atomic weight of less than 80 and include at least one halogen atom having an atomic weight between 35 and 80 and at least a stoichiometric proportion of anhydrous hydrogen fluoride with a catalyst which consists essentially of an activated anhydrous chromium (III) oxide at a temperature in the range of from about 150° C. to about 700° C. such that the principal reaction is the substitution of fluorine for other halogen of the halogenated hydrocarbon, and separating the fluorinated compound from the reaction mixture.

6. The process for preparing carbon tetrafluoride which comprises contacting a vapor mixture of carbon tetrachloride and at least a stoichiometric proportion of anhydrous hydrogen fluoride with a catalyst which consists essentially of an activated anhydrous chromium (III) oxide at a temperature in the range of from about 300° C. to about 600° C., and separating carbon tetrafluoride from the reaction mixture.

7. The process for preparing dichlorodifluoromethane which comprises contacting a vapor mixture of carbon tetrachloride and at least a stoichiometric proportion of anhydrous hydrogen fluoride with a catalyst which consists essentially of an activated anhydrous chromium (III) oxide at a temperature in the range of from about 150° C. to about 250° C., and separating dichlorodifluoromethane from the reaction mixture.

8. The process for fluorinating halohydrocarbons which comprises contacting a vapor mixture of a halogenated aliphatic hydrocarbon of 1 to 8 carbon atoms in which adjacent carbons are linked solely by 1 to 2 valence bonds and in which the halogen atoms have an atomic weight of less than 80 and include at least one halogen atom having an atomic weight between 35 and 80 and at least a stoichiometric proportion of anhydrous hydrogen fluoride with a catalyst at a temperature in the range of from about 150° C. to about 700° C. such that the principal reaction is the substitution of fluorine for other halogen of the halogenated hydrocarbon, said catalyst consisting essentially of an activated anhydrous chromium (III) oxide gel, made by reducing chromium trioxide with ethanol and then dehydrating the reduced product at a temperature of from about 400° C. to about 600° C. in an inert atmosphere, and separating the fluorinated compound from the reaction mixture.

9. The process for fluorinating halohydrocarbons which comprises contacting a vapor mixture of a halogenated saturated acyclic hydrocarbon of 1 to 8 carbon atoms in which the halogen atoms have an atomic weight of less than 80 and include at least one halogen atom having an atomic weight between 35 and 80 and at least a stoichiometric proportion of anhydrous hydrogen fluoride with a catalyst at a temperature in the range of from about 150° C. to about 700° C. such that the principal reaction is the substitution of fluorine for other halogen of the halogenated hydrocarbon, said catalyst consisting essentially of an activated anhydrous chromium (III) oxide gel, made by reducing chromium trioxide with ethanol and then dehydrating the reduced product at a temperature of from about 400° C. to about 600° C. in an inert atmosphere, and separating the fluorinated compound from the reaction mixture.

10. The process for fluorinating halohydrocarbons which comprises contacting a vapor mixture of a completely halogenated saturated acyclic hydrocarbon of 1 to 8 carbon atoms in which the halogen atoms have an atomic weight of less than 80 and include at least one halogen atom having an atomic weight between 35 and 80 and at least a stoichiometric proportion of anhydrous hydrogen fluoride with a catalyst at a temperature in the range of from about 150° C. to about 700° C. such that the principal reaction is the substitution of fluorine for other halogen of the halogenated hydrocarbon, said catalyst consisting essentially of an activated anhydrous chromium (III) oxide gel, made by reducing chromium trioxide with ethanol and then dehydrating the reduced product at a temperature of from about 400° C. to about 600° C. in an inert atmosphere, and separating the fluorinated compound from the reaction mixture.

11. The process for preparing carbon tetrafluoride which comprises contacting a vapor mixture of dichlorodifluoromethane and at least a stoichiometric proportion of anhydrous hydrogen fluoride with a catalyst at a temperature in the range of from about 300° C. to about 600° C., said catalyst consisting essentially of an activated anhydrous chromium (III) oxide gel, made by reducing chromium trioxide with ethanol and then dehydrating the reduced product at a temperature of from about 400° C. to about 600° C. in an inert atmosphere, and separating carbon tetrafluoride from the reaction mixture.

12. The process for preparing trifluoromethane which comprises contacting a vapor mixture of chloroform and at least a stoichiometric proportion of anhydrous hydrogen fluoride with a catalyst at a temperature in the range of from about 300° C. to about 500° C., said catalyst consisting essentially of an activated anhydrous chromium (III) oxide gel, made by reducing chromium trioxide with ethanol and then dehydrating the reduced product at a temperature of from about 400° C. to about 600° C. in an inert atmosphere, and separating trifluoromethane from the reaction mixture.

13. The process for preparing chloropentafluoroethane which comprises contacting a vapor mixture of 1,2-dichlorotetrafluoroethane and at least a stoichiometric proportion of anhydrous hydrogen fluoride with a catalyst at a temperature in the range of from about 350° C. to about 450° C., said catalyst consisting essentially of an activated anhydrous chromium (III) oxide gel, made by reducing chromium trioxide with ethanol and then dehydrating the reduced product at a temperature of from about 400° C. to about 600° C. in an inert atmosphere, and separating chloropentafluoroethane from the reaction mixture.

14. The process for preparing hexafluoroethane which comprises contacting a vapor mixture of 1,2-dichlorotetrafluoroethane and at least a stoichiometric proportion of anhydrous hydrogen fluoride with a catalyst at a temperature in the range of from about 400° C. to about 600° C., said catalyst consisting essentially of an activated anhydrous chromium (III) oxide gel, made by reducing chromium trioxide with ethanol and then dehydrating the reduced product at a temperature of from about 400° C. to about 600° C. in an inert atmosphere, and separating hexafluoroethane from the reaction mixture.

15. The process for preparing 1,2-dichlorotetrafluoroethane which comprises contacting a vapor mixture of 1,1,2-trichlorotrifluoroethane and at least a stoichiometric proportion of anhydrous hydrogen fluoride with a catalyst at a temperature in the range of from about 250° C. to about 350° C., said catalyst consisting essentially of an activated anhydrous chromium (III) oxide gel, made by reducing chromium trioxide with ethanol and then dehydrating the reduced product at a temperature of from about 400° C. to about 600° C. in an inert atmosphere, and separating 1,2-dichlorotetrafluoroethane from the reaction mixture.

16. The process for preparing 1,2-dichlorotetrafluoroethane which comprises contacting a vapor mixture of 1,1,2-trichlorotrifluoroethane and at least a stoichiometric proportion of hydrogen fluoride with a catalyst at a temperature in the range of from about 250° C. to about 350° C., said catalyst consisting essentially of an activated anhydrous chromium (III) oxide, made by reducing chromium trioxide and separating 1,2-dichlorotetrafluoroethane from the reaction mixture.

17. The process for fluorinating halohydrocarbons which comprises contacting a vapor mixture of (1) halogenated aliphatic hydrocarbon of up to 4 carbon atoms, in which adjacent carbon atoms are linked solely by 1 to 2 valance bonds and in which the halogen atoms are members of the group consisting of chlorine and fluorine and include at least two chlorine atoms, and (2) at least a stoichiometric proportion of hydrogen fluoride with a catalyst which consists essentially of an activated anhydrous chromium (III) oxide at a temperature in the range of from 200° C. to 500° C., and separating the fluorinated compound from the reaction mixture.

References Cited by the Examiner

UNITED STATES PATENTS

| 2,271,356 | 1/1942 | Turkevich et al. | 252—467 |
| 2,436,143 | 2/1948 | Hoehn | 260—653.7 |
| 2,745,886 | 5/1956 | Ruh et al. | 260—653.7 |
| 2,871,274 | 1/1959 | Ruh et al. | 260—653.8 |

LEON ZITVER, *Primary Examiner.*

ALLAN M. BOETTCHER, ALPHONSO D. SULLIVAN, *Examiners.*

D. D. HORWITZ, E. M. FINK, M. L. McCLANAHAN, J. W. WILLIAMS, *Assistant Examiners.*